(12) United States Patent
Hess, Jr. et al.

(10) Patent No.: US 8,083,919 B2
(45) Date of Patent: Dec. 27, 2011

(54) MEMBRANE ELECTRODE ASSEMBLIES AND ELECTROPAINT SYSTEMS INCORPORATING SAME

(76) Inventors: H. Frederick Hess, Jr., Valparaiso, IN (US); H. Frederick Hess, III, Valparaiso, IN (US); Steven Jovanovic, Valparaiso, IN (US); James E. Rittel, Jr., Hanna, IN (US)

( * ) Notice: Subject to any disclaimer, the term of this patent is extended or adjusted under 35 U.S.C. 154(b) by 537 days.

(21) Appl. No.: 12/206,272

(22) Filed: Sep. 8, 2008

(65) Prior Publication Data

US 2009/0000945 A1  Jan. 1, 2009

Related U.S. Application Data

(62) Division of application No. 10/443,303, filed on May 22, 2003, now Pat. No. 7,442,673.

(51) Int. Cl.
 *C25D 17/10* (2006.01)
(52) U.S. Cl. .................. 204/626; 204/640; 204/282
(58) Field of Classification Search .................. 204/626, 204/640, 282, 262
 See application file for complete search history.

(56) References Cited

U.S. PATENT DOCUMENTS

| | | | |
|---|---|---|---|
| 3,620,955 A | 11/1971 | Jones | |
| 3,945,900 A | 3/1976 | Klinkowski | |
| 3,959,111 A | 5/1976 | Mardine et al. | |
| 4,075,069 A | 2/1978 | Shinohara et al. | |
| 4,201,653 A | 5/1980 | O'Neill et al. | |
| 4,212,337 A | 7/1980 | Kamp | |
| 4,363,345 A | 12/1982 | Scheibner | |
| 4,515,674 A | 5/1985 | Takahashi | |
| 4,663,016 A | 5/1987 | Takahashi et al. | |
| 4,834,861 A | 5/1989 | Inoue | |
| 4,933,051 A | 6/1990 | Kline | |
| 5,049,253 A * | 9/1991 | Izuo et al. | 204/630 |
| 5,078,850 A | 1/1992 | Inoue | |
| 5,507,929 A | 4/1996 | Brochu et al. | |
| 5,591,316 A | 1/1997 | Hess, Jr. et al. | |
| 5,759,371 A | 6/1998 | Walker et al. | |

FOREIGN PATENT DOCUMENTS

| | | |
|---|---|---|
| JP | 59-89798 | 5/1984 |
| JP | 59-193299 | 11/1984 |

OTHER PUBLICATIONS

Alcore Fabricating Corporation, "High Performance HP-C Semi-Circular Anolyte Cells for Electro-Coating Systems", Product Information Nov. 25, 1992.
ARELCO, Electro D Alyss Cells Products Book.
UFS Corporation Product Tata Sheet, TECTRON SD Side Membrane Electrode Cell, Oct. 29, 1999.

* cited by examiner

*Primary Examiner* — Kishor Mayekar
(74) *Attorney, Agent, or Firm* — Woodard, Emhardt, Moriarty, McNett & Henry, LLP

(57) ABSTRACT

Described are novel systems for electrodeposition of paint on counter-electrodes, and membrane electrode assemblies for incorporation into such systems. In certain embodiments of the invention, electrode enclosures such as C-shaped or box-shaped enclosures include membranes sealed to secondary structural members by bonding. In other embodiments, membrane electrode cells having bumpers are mounted within paint baths in a manner wherein the bumpers are forcibly biased against the exterior wall of the bath, thereby stabilizing the position of the cells. In still further embodiments, tubular electrode cells are provided with internal valves allowing the release of liquid trapped within the tubular electrodes into the membrane shell. In this manner, removal of the electrodes for maintenance, replacement or other purposes is facilitated.

12 Claims, 10 Drawing Sheets

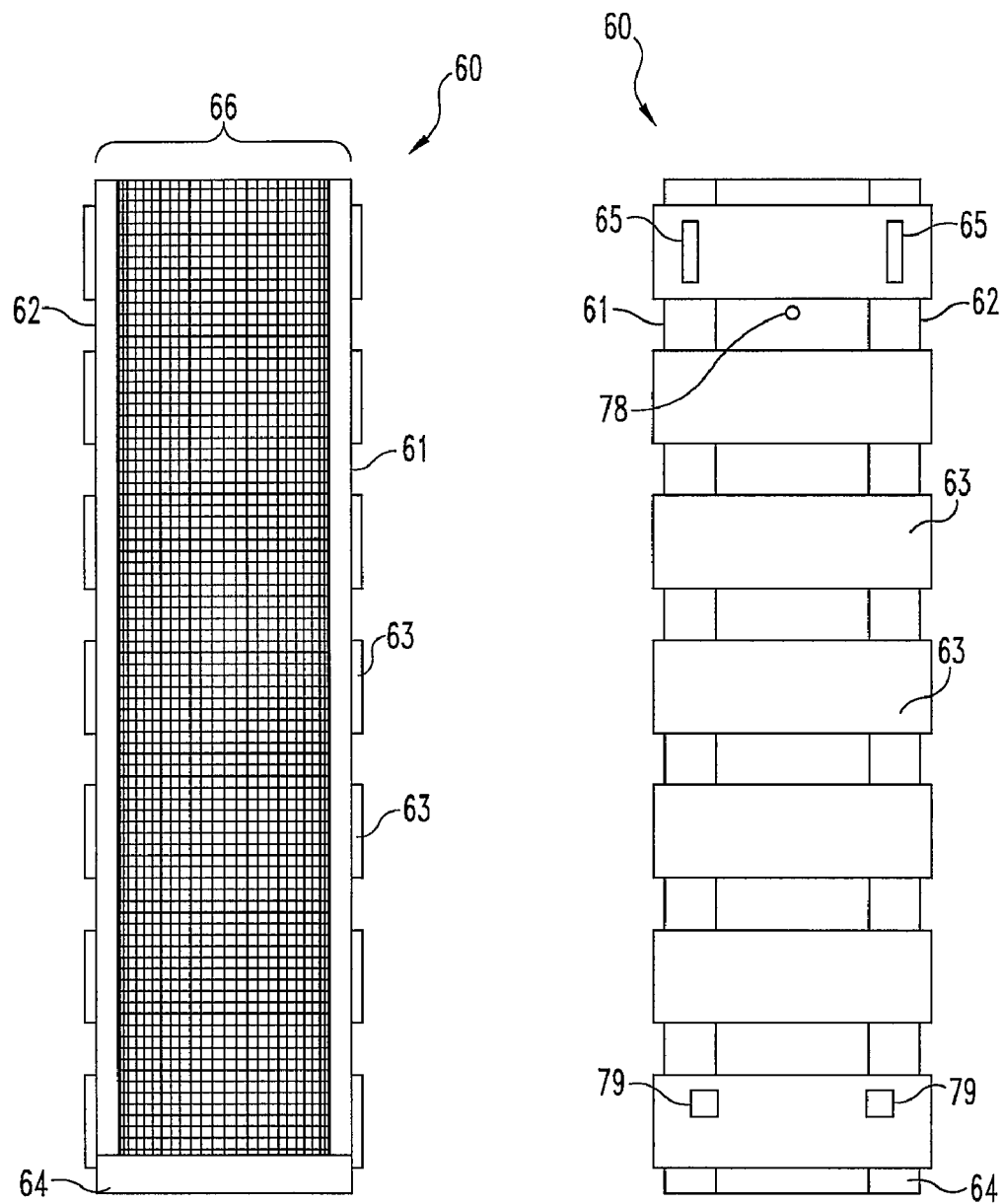
*Fig. 10*  *Fig. 11*

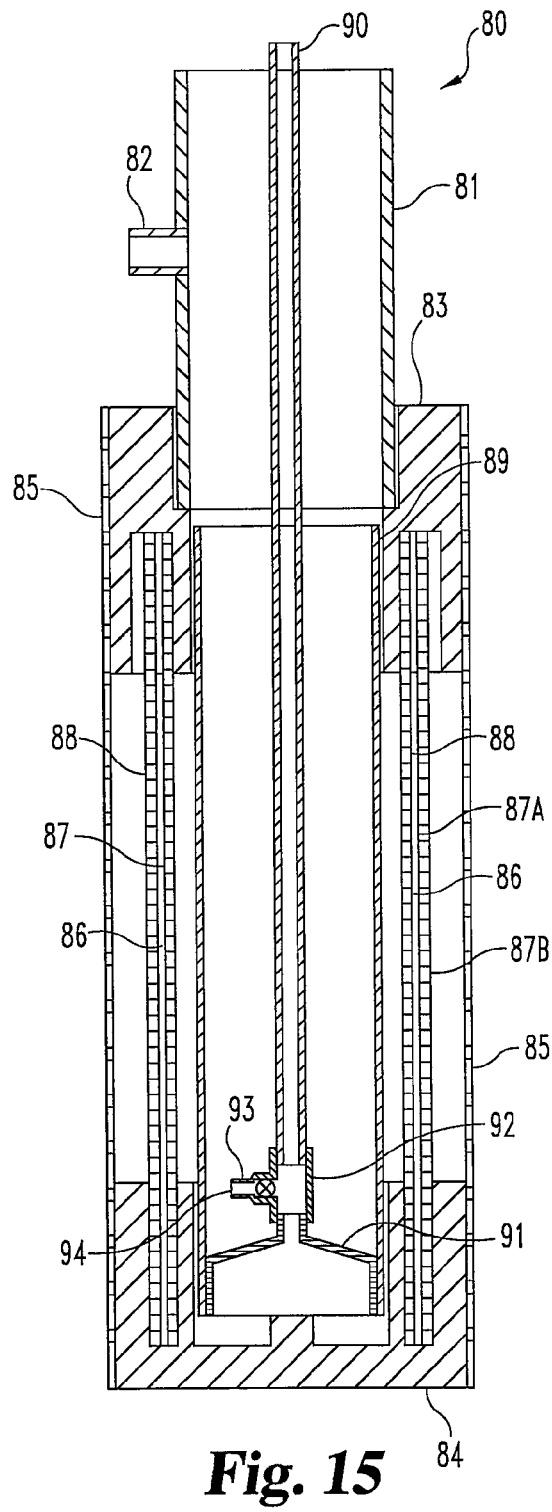
Fig. 15
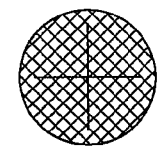
Fig. 15A
Fig. 15B

MEMBRANE ELECTRODE ASSEMBLIES AND ELECTROPAINT SYSTEMS INCORPORATING SAME

The present application is a divisional patent application of U.S. patent application Ser. No. 10/443,303 filed May 22, 2003, now U.S. Pat. No. 7,442,673 issued Sep. 9, 2008, which is hereby incorporated herein by reference in its entirety.

BACKGROUND OF THE INVENTION

The present invention relates to membrane electrode cells and systems used in electrodeposition coating. More particularly, in certain embodiments, the present invention relates to advantageous membrane electrode cell assemblies having electrode enclosures wherein the membrane seal of the enclosure is provided by a compression-independent, bonded arrangement.

As further background, electrodeposition coating, or "electrocoating", is broadly classified into two categories. Anionic electrodeposition uses anionic paints; cationic electrodeposition uses cationic paints. Both of these processes are in current commercial use.

Membrane electrode cells are commonly used in electrodeposition systems. Such cells act as opposing electrodes in the electrodeposition process, with the object being painted serving as the counter-electrode. Membrane electrode cells also serve in many systems to remove ions from the paint bath to maintain proper paint bath chemistry.

The membrane electrode cell can have many shapes, and often is shaped as a flat rectangle, arcuate or semi-circle, tube or cylinder. Electrodeposition processes employing such membrane electrode cells are disclosed for example in U.S. Pat. Nos. 4,851,102, 4,711,709 and 4,834,861.

The membrane used in a membrane electrode cell can be either ion-exchange or neutral. The membrane is arranged in such a fashion as to separate the electrocoating paint bath from the electrode. An electrolyte fluid flows between the inside of the membrane and the outside of the electrode. This electrolyte fluid, which is often comprised mostly of deionized water and a small amount of acid or amine (depending on the type of electrocoating employed), is responsible for flushing the ions that pass through the membrane into the membrane electrode cell from the paint bath. The conductivity of this electrolyte fluid usually is maintained in the range of 500 to 2,000 microSiemens/cm (microMho/cm).

To separate the electrode from the paint bath, it is a common practice to provide a seal between the membrane and other structural member(s) of the electrode cell. These seals have in the past commonly been achieved by mechanical elements such as bolted flanges, which form a pressure-dependent seal between the flange, membrane, and an outer rim or periphery of an electrode housing. These seals can be difficult to maintain, and present complications in repair and replacement operations.

In light of this and other background in the field, there remain needs for membrane electrode assemblies of simplified design and which are more readily repaired, replaced and/or maintained. The present invention is addressed to these needs.

SUMMARY OF THE INVENTION

Accordingly, one aspect of the present invention provides a system for electrodeposition of paint on a counter-electrode. The inventive system includes an electrodeposition chamber containing an electroconductive liquid medium including paint. At least one membrane electrode assembly is in the chamber in contact with the liquid medium. The electrode assembly includes an electrode and an enclosure separating the electrode from the liquid medium. The enclosure has a first structural member and a membrane bonded to the first structural member to provide a seal therebetween. A counter-electrode upon which paint is to be electrodeposited is in the chamber in contact with the liquid medium. Passage of electrical current between the counter-electrode and the electrode in the membrane electrode assembly through the liquid medium causes electrodeposition of the paint on the counter-electrode. In preferred embodiments, the electrode within the membrane electrode assembly is a flat or arcuate-shaped electrode, and the membrane can be bonded to the first structural member by welding, chemical bonding agents, polymers, and the like.

In another embodiment, the present invention provides a membrane electrode assembly for use in a paint electrodeposition chamber containing a liquid medium. The assembly includes an electrode, and an enclosure for separating the electrode from the liquid medium. The enclosure includes a first structural member, and a membrane bonded to the first structural member to provide a seal therebetween. In certain embodiments, the electrode is a flat or arcuate shaped electrode, and the membrane is bonded to a multiple-sided periphery of the structural member.

In another embodiment, the present invention provides a membrane electrode assembly for use in a paint electrodeposition chamber, wherein the assembly includes an electrode, and an enclosure for separating the electrode from a liquid medium within the chamber. The enclosure includes a non-electrically-conductive coating covering a first surface portion of the electrode. The enclosure further includes a membrane for separating a second surface portion of the electrode from the liquid medium.

In still another embodiment, the invention provides a membrane electrode assembly for use in a paint electrodeposition chamber, wherein the chamber has an electrode mount adjacent to the top of the chamber. The membrane electrode assembly of the invention includes an electrode and an enclosure for separating the electrode from the liquid medium in the chamber. The enclosure also includes a membrane, and a frame holding the membrane, the frame having a top end and a bottom end. An attachment member is located adjacent the top of the frame, for attaching the membrane electrode assembly to the electrode mount. The membrane electrode assembly includes a bumper element for contacting a wall of the electrodeposition chamber, the bumper element attached to the frame and spaced from the top end of the frame. In the inventive arrangement, the attachment member, frame and bumper element are arranged to force the bumper element against the wall when the attachment member is attached to the electrode mount.

In still another embodiment, the present invention provides a membrane electrode assembly for use in a paint electrodeposition chamber containing a liquid medium. The membrane electrode assembly includes a tubular electrode, and a tubular enclosure including a membrane for separating the electrode from the liquid medium. The tubular electrode received within said tubular enclosure wherein liquid can be trapped within the interior of the tubular electrode. A valve is provided in fluid communication with the interior of the tubular electrode and adapted to selectively permit fluid flow from the interior of the tubular electrode into the tubular enclosure. Electrodeposition systems and methods using such assemblies also form a part of the present invention.

Additional features, advantages and embodiments of the invention will be apparent to those of ordinary skill in the art from the descriptions herein.

BRIEF DESCRIPTION OF THE DRAWINGS

FIG. 10 provides a front view of the electrode cell assembly of FIG. 9.

FIG. 11 provides a rear view of the electrode cell assembly of FIG. 9.

FIG. 15 provides a cross-sectional view of a tubular membrane electrode assembly of the invention.

FIGS. 15A and 15B provide front and rear views, respectively, of a flap valve for use in the assembly of FIG. 15.

DESCRIPTION OF THE PREFERRED EMBODIMENTS

For the purpose of promoting an understanding of the principles of the invention, reference will now be made to certain preferred embodiments thereof and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

As disclosed above, the present invention provides membrane electrode assemblies, electodeposition systems, and related methods for electrodepositing paint on a counter-electrode.

In general, membrane electrode assemblies of the invention, and used in systems and methods of the invention, will include an electrode, and an enclosure for separating the electrode from liquid medium in the electrodeposition chamber. The enclosure will typically include at least one membrane, such as a selectively permeable membrane, e.g. an ion-exchange membrane. The enclosure will include at least one other element, typically a frame member, and a seal between the membrane and the frame member to complete the enclosure. In accordance with the preferred embodiments of the invention, this seal is provided by a bonding of the membrane to the frame member. This bonding may be achieved, for example, by welding, chemical bonding agents, and the like. Such bonded seals are in general compression-independent, meaning that they do not require compression of the membrane against the frame member in order to achieve a seal, as is the case in many current systems in which a flange is tightened over the membrane in order to seal it against a frame member.

Figure 1:
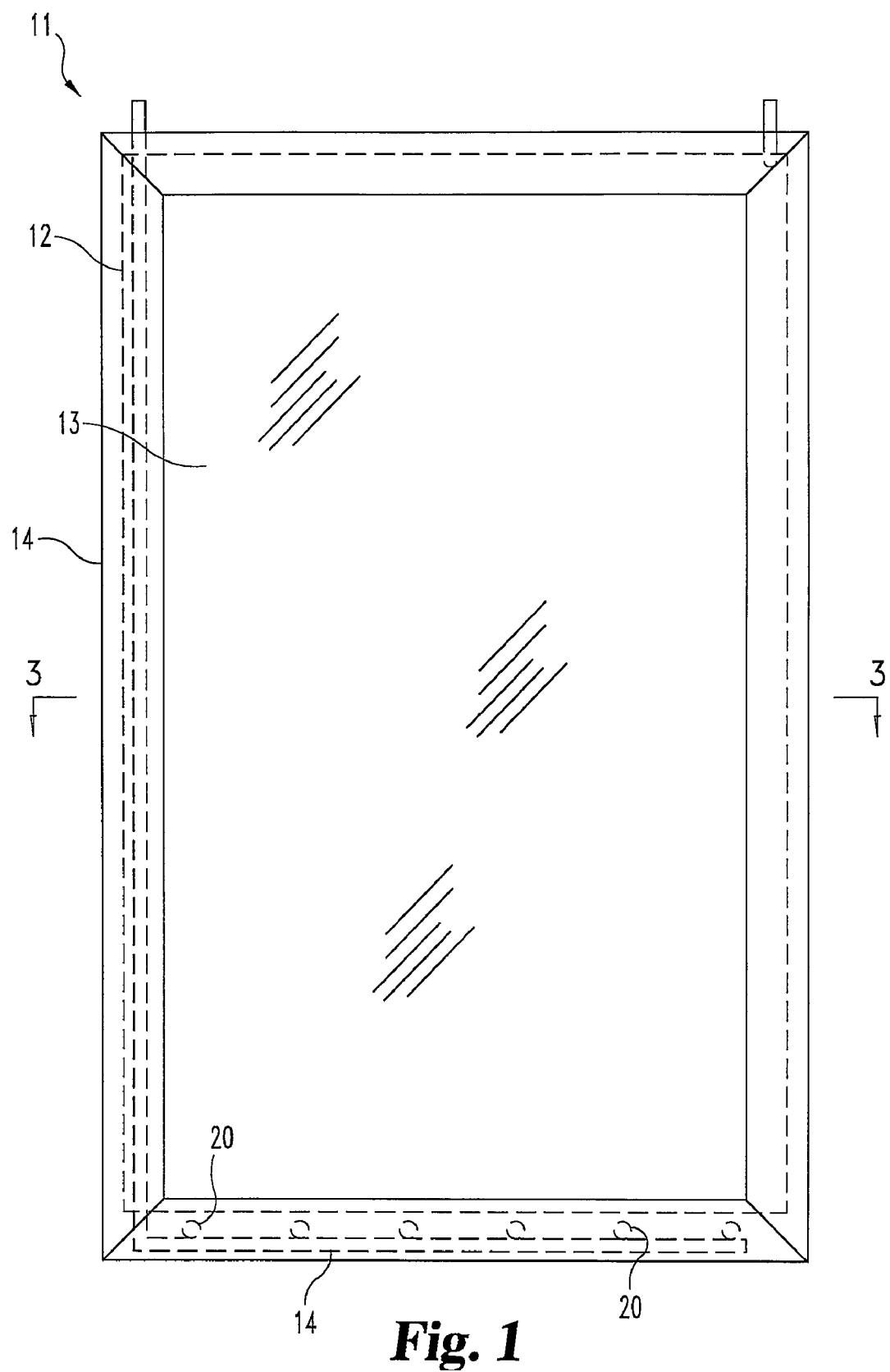
FIG. 1 provides a perspective view of a preferred membrane electrode cell assembly of the invention.

With reference now to FIG. 1, disclosed is a first membrane electrode assembly 11 of the present invention. Membrane electrode assembly 11 includes an internal electrode 12, and an enclosure enclosing the electrode. Assembly 11 further includes a membrane 13, and at least one additional structural element in the enclosure. In the illustrated assembly 11, the enclosure also includes four strip elements 14 arranged around the membrane 13 and electrode 12. Strip elements 14 in general wrap around the membrane 13 and the electrode 12, and a bonding agent can be employed at the contact locations in order to provide a seal.

Figure 2:
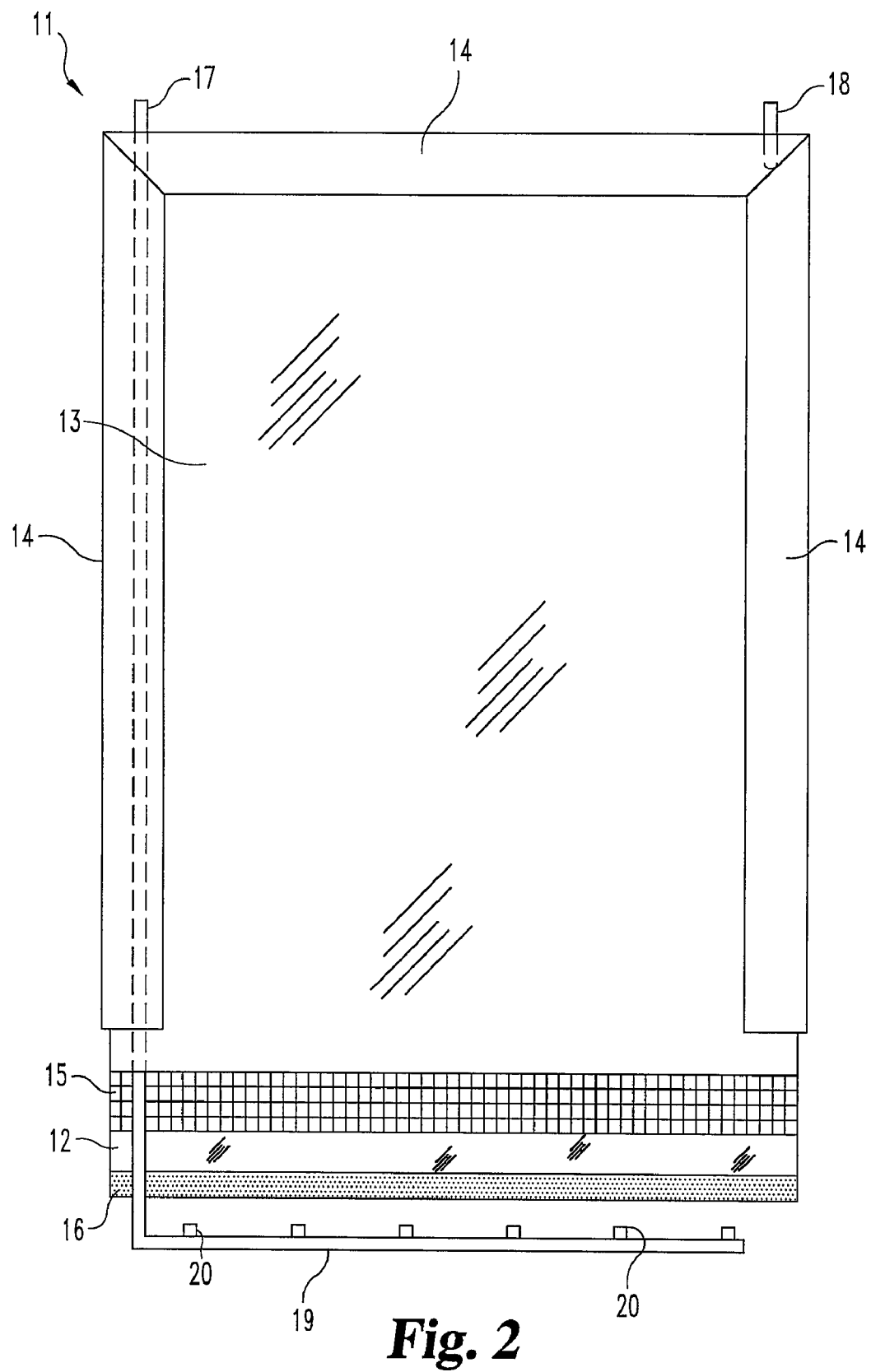
FIG. 2 provides a partial cut-away view of the cell assembly of FIG. 1.

With reference now to FIGS. 1 and 2 together, additional components of the assembly 11 will be described. FIG. 2 in particular shows a partial cut-away of the assembly 11 at various locations in order to reveal layers within. Membrane 13 provides the outermost layer, and is separated from electrode 12 by a separating layer 15 formed of a suitable non-conductive material such as a plastic mesh. Separating layer 15 insures that membrane 13 does not contact electrode 12 which may result in undesired degradation of membrane 13. Located behind electrode 12 is insulative layer 16 made from a non-electrically-conductive material. Insulative layer 16 may, for example, be provided by a non-conductive substance painted or applied to the rear surface of the electrode 12. Layer 16 may also be provided by any other suitable non-conductive layer or material that can be used to electrically isolate electrode 12. Strip elements 14 encompass and wrap around membrane 13, separating layer 15, electrode 12, and insulating layer 16. In this fashion, electrode 12 is provided within an enclosure separated from the paint or other liquid medium in the electrodeposition bath by membrane 13.

Figure 3:
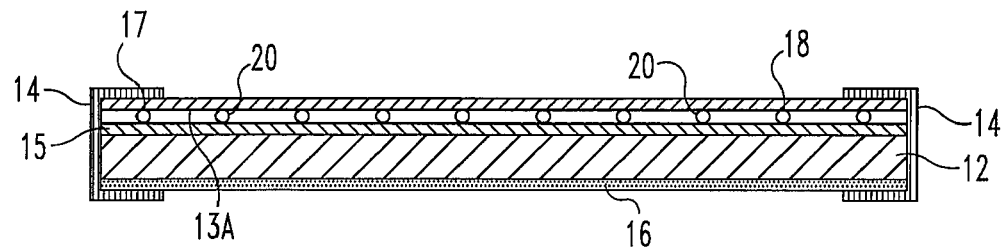
FIG. 3 provides a cross-sectional view of the cell assembly of FIG. 1, taken along line 3-3 and viewed in the direction of the arrows.

With reference now to FIGS. 1-3 together, membrane electrode assembly 11 is also provided with a system for circulating fluid across the inner surface 13a of the membrane 13 in order to prevent undesirable accumulation of materials at the surface 13a. FIG. 3, in particular, provides a cross-sectional view taken along line 3-3 of FIG. 1 and viewed in the direction of the arrows. Assembly 11 includes a fluid inlet tube 17 and a fluid outlet tube 18 for circulating fluid within the enclosure of the membrane electrode assembly 11. In the illustrated embodiment, fluid inlet tube 17 circulates fluid to the bottom of the assembly 11, and has an outlet manifold 19 with multiple outlets 20 for causing the fluid to pass upwardly in the assembly 11. Outlets 20 are positioned to cause fluid flow between the membrane 13 and the separating layer 15. In this fashion, fluid is circulated against the inner surface 13a of the membrane 13 to facilitate removal of any materials becoming deposited thereon.

Figure 4:
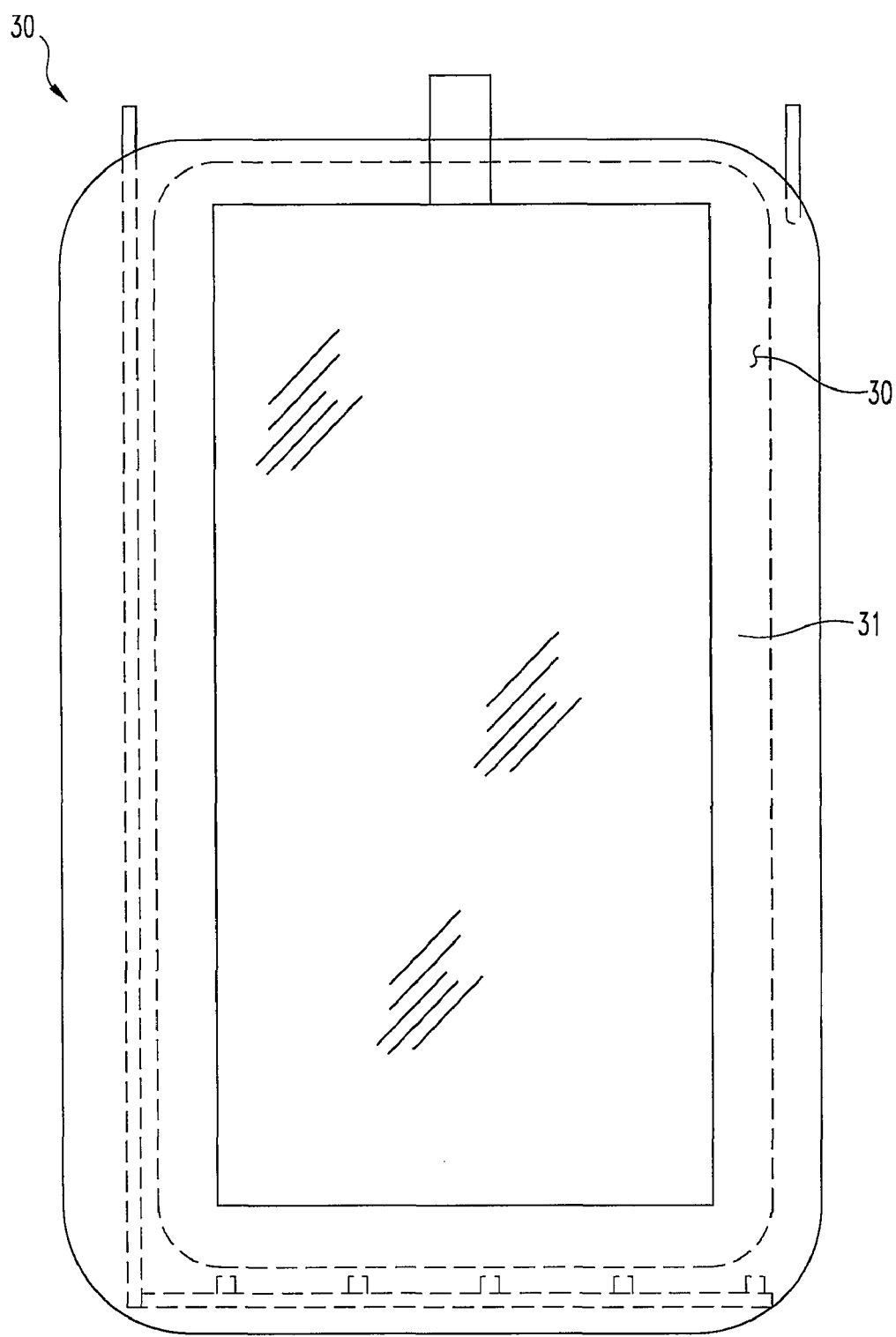
FIG. 4 provides a perspective view of another preferred membrane electrode cell assembly of the invention.
Figure 5:
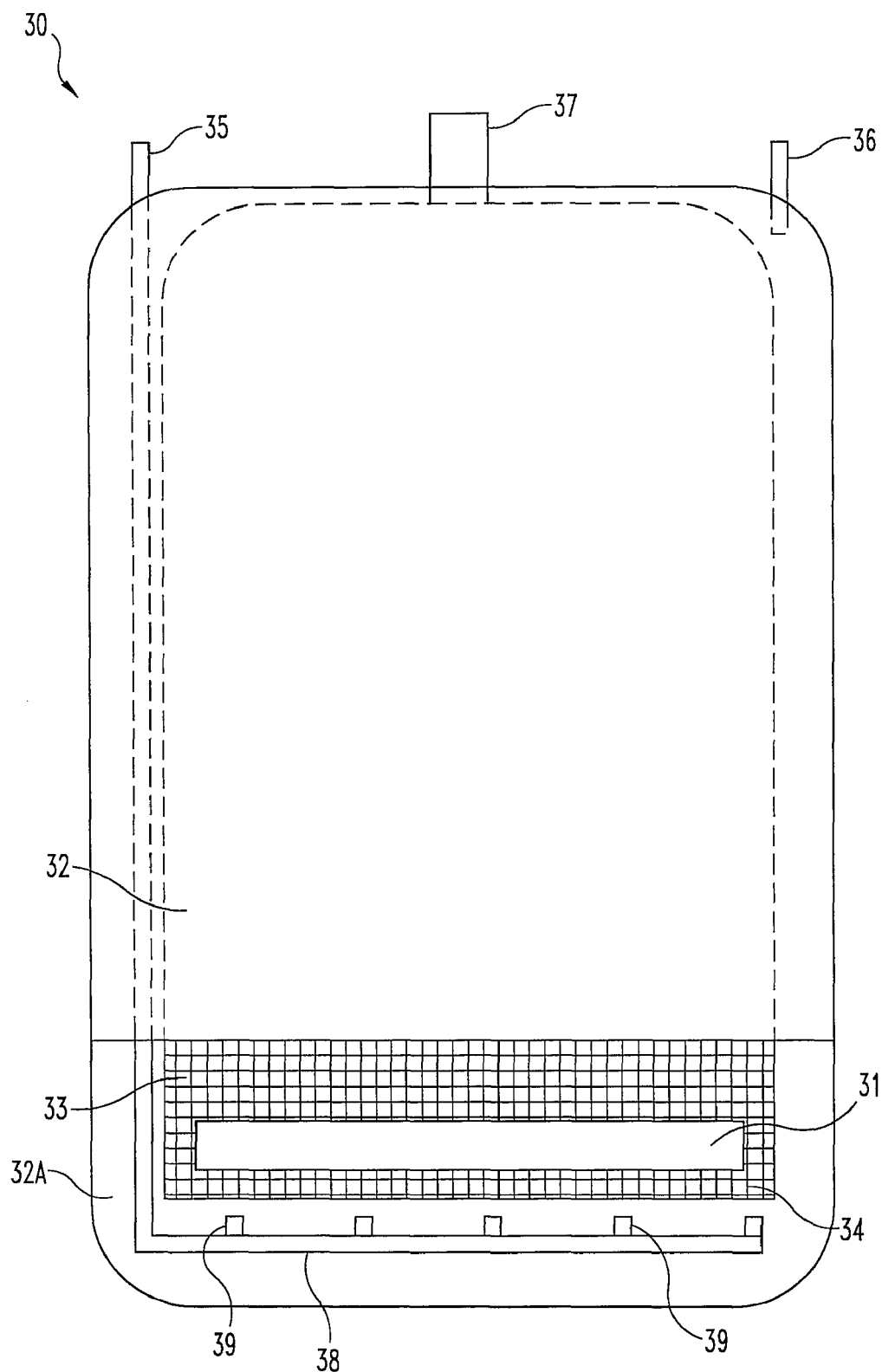
FIG. 5 provides a partial cut-away view of the cell assembly of FIG. 4.

With reference now to FIGS. 4-5, shown is another membrane electrode cell 30 of the present invention. Membrane electrode cell 30 includes an electrode 31 preferably made of a suitable metal, enclosed by a membrane 32, preferably an ion exchange membrane. With reference in particular to FIG. 5, shown is a partial cut-away view showing the various components and layers of the electrode 30. Electrode 30 includes a first membrane layer 32 and a porous spacer element 33 residing immediately adjacent membrane layer 32 and separating layer 32 from the electrode 31. Electrode cell 30 also includes a second spacer element 34 which separates electrode 31 from another layer 32A of membrane material similar to that in membrane layer 32. Membrane layers 32 and 32A are sealed together about their peripheries, for example by heat welding or the like. Sealed membrane layers 32 and 32A thus enclose the electrode 31 and the spacer elements 33 and 34. Electrode cell 30 also includes an electrolyte circulation system including an inlet tube 35 which extends from the top of the cell to a location adjacent the bottom, and an electrolyte exit tube 36. Inlet tube 35 is connected to a laterally-extending baffle tube 38 which in turn has several fluid delivery tubes 39 extending therefrom and opening into the interior of the cell. Thus, electrolyte passed through inlet tube 35 and baffle tube 38 exits from the various outlet tubes 39 and creates an upward flow of electrolyte within the cell 30, ultimately exiting via outlet tube 36. Electrode cell 30 also includes a hanging bracket 37 from which the cell 30 can be suspended in a paint bath. As discussed above, in some embodiments, the electrode cell 30 is completely sealed apart from the inlet and outlet openings 35 and 36. In other embodiments, the upper end of the electrode cell 30 may be left unsealed, and the electrode cell 30 suspended in the paint bath such that any unsealed portions are above the level of the bath.

Figure 8:
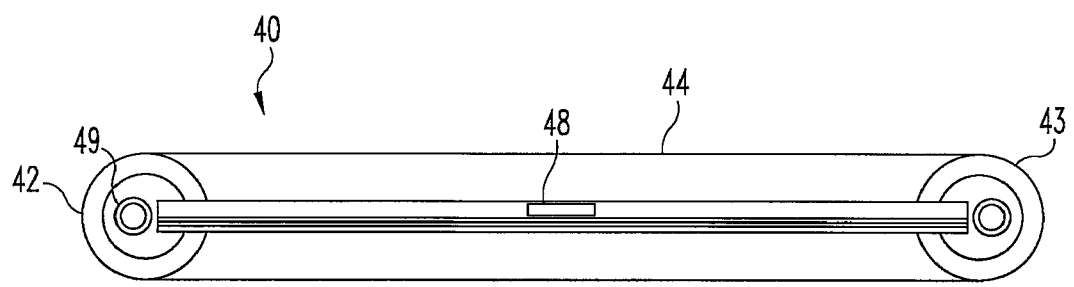
FIG. 8 provides a top view of the cell assembly of FIG. 6.
Figure 6:
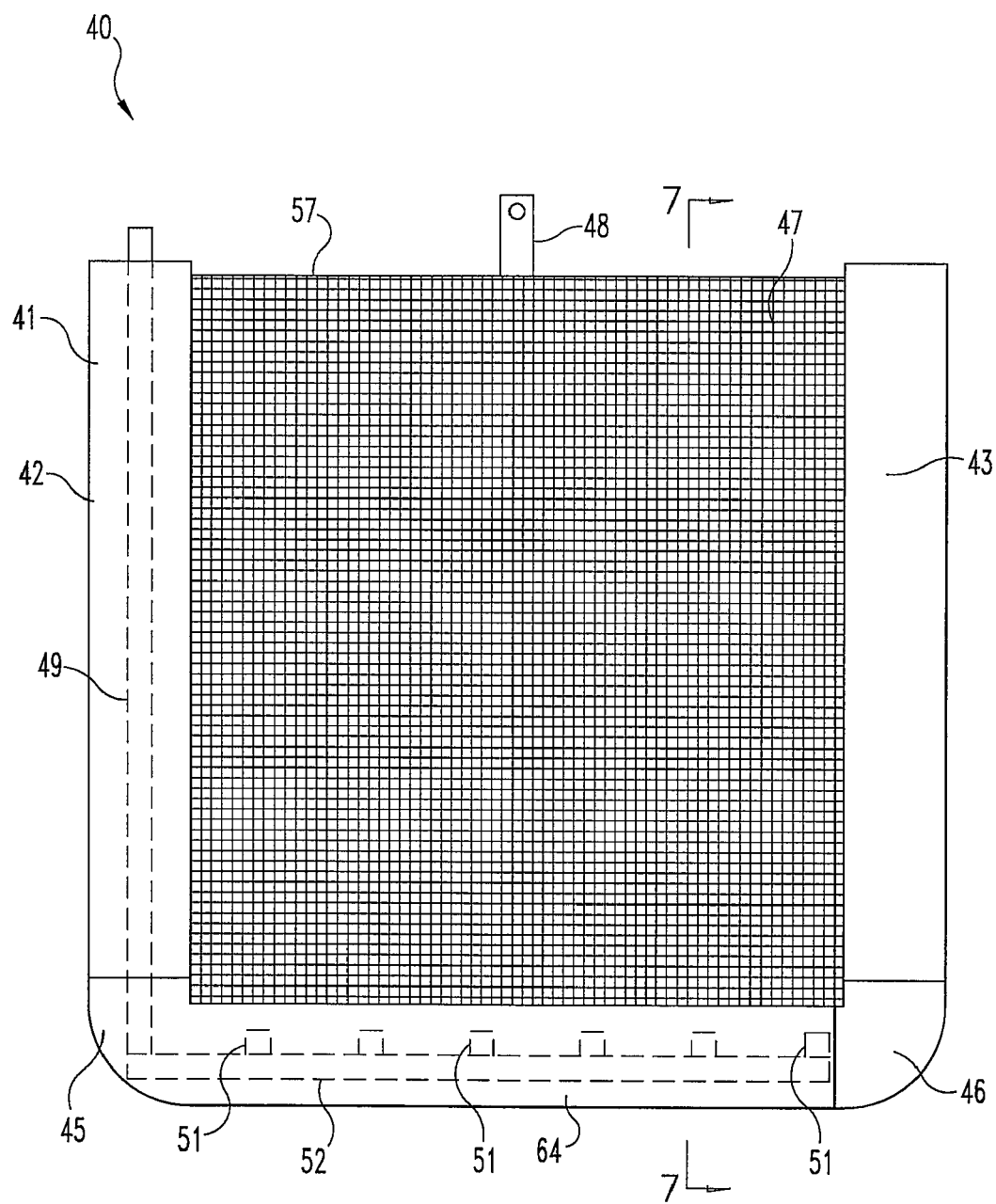
FIG. 6 provides a side view of another preferred membrane electrode cell assembly of the invention.
Figure 7:
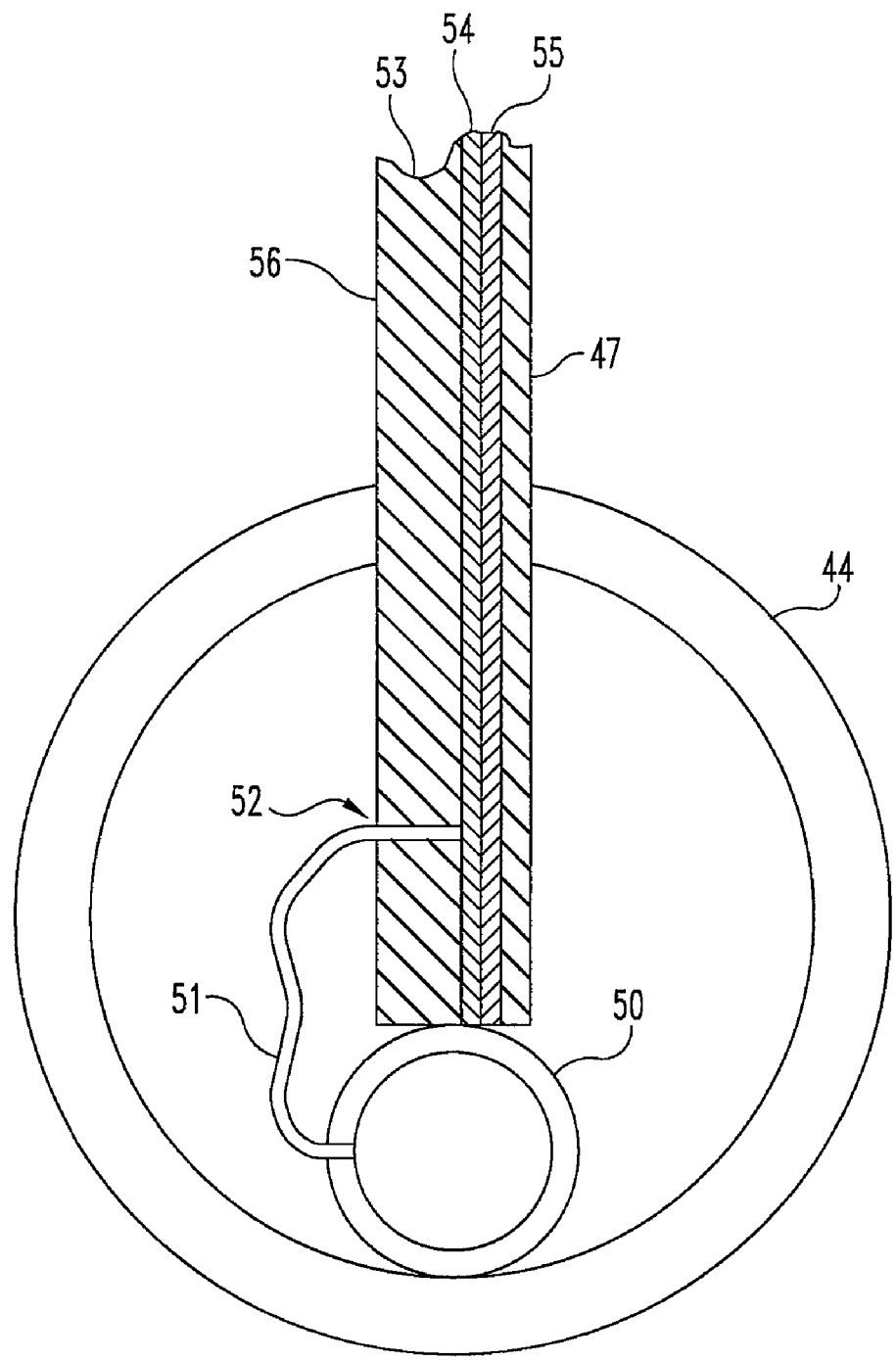
FIG. 7 provides a cut-away cross-sectional view of the lower portions of cell assembly of FIG. 6 taken along line 7-7 and viewed in the direction of the arrows.

With reference to FIGS. 6-8, shown is another membrane electrode cell 40 of the present invention. Membrane electrode cell 40 is similar in design to membrane electrode cell 11 illustrated in FIGS. 1-3. However, membrane electrode cell 40 includes a frame 41 constructed from tubular elements, for example, polymer tubing, including polyvinylchloride (PVC) tubing. Frame 41 as depicted includes two vertically extending tubular elements 42 and 43 and a horizontally extending element 44 all interconnected by curved or elbow sections 45 and 46. It will be understood that frame 41 could also be made of fewer pieces or a single piece of tubing configured to an appropriate shape. Visible in FIG. 6 are electrode cell frame 41, outermost membrane guard 47, and hanging bracket 48. Also shown in phantom is the electrolyte distribution system including an inlet tube 49, a lateral tube 50 providing a manifold, and several outlet tubes 51.

With reference now particularly to FIG. 7, shown is a partial cut-away cross-sectional view taken along line 7-7 of FIG. 6 and viewed in the direction of the arrows. Shown is lateral tube 44 of cell frame 41. Housed within tube 44 is the lateral electrolyte distribution tube 50 with electrolyte outlet tube 51 extending therefrom. Electrolyte tube 51 extends through an aperture 52 provided through the electrode 53. Immediately adjacent to electrode 53 is a spacer element 54 separating an ion exchange membrane 55 from the electrode 53. A nonconductive or otherwise insulating layer 56 is provided on the back side of electrode 53 to insulate the same from the paint bath. As shown in FIG. 7, the electrode 53 along with the spacer 54, membrane 55 and guard 47 all penetrate a location in the tube 44. A similar arrangement is found in the remainder of the tubular frame 41. In this fashion, the tubular frame 41 serves to support these structures. The penetration of the tube 44 and in other locations of the frame 41 is sealed fluid tight. In operation of cell 40, the cell 40 is suspended into the paint bath using bracket 48, with the upper edge 57 of the electrode 53 and associated guard, membrane and spacer remaining above the surface of the paint bath. Electrolyte is circulated through tube 49 thus exiting outlets 51 and flowing through apertures 52 in the anode thereby reaching the front surface of the anode and circulating upwardly in the cell in between the anode 53 and the membrane 55. Thus, membrane electrode cell 40 provides a convenient, inexpensive electrode for use in paint baths and other similar applications.

Figure 9:
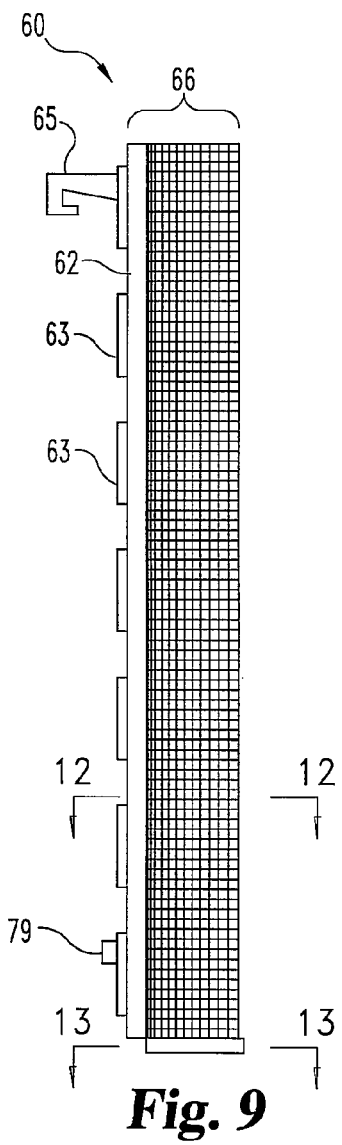
FIG. 9 provides a side view of a C-shaped membrane electrode cell assembly of the present invention.

With reference now to FIGS. 9-11, shown are side, front and back views of a C-shaped membrane electrode cell 60 of the present invention. Membrane electrode cell 60 generally includes a pair of elongate rails 61 and 62 interconnected to one another by a plurality of cross-brace members 63. The rails 61 and 62 terminate in a bottom end cap 64. A pair of support brackets 65 are attached to uppermost cross-brace member 63 and are used to suspend the membrane electrode cell 60 from a rail or other supporting device located adjacent to the edge of a paint bath. Cell 60 also includes an electrode and associated support, spacer, membrane and guard elements all having an arcuate shape, preferably in the shape of a section of a circle, such as a semi-circle.

Figure 12:
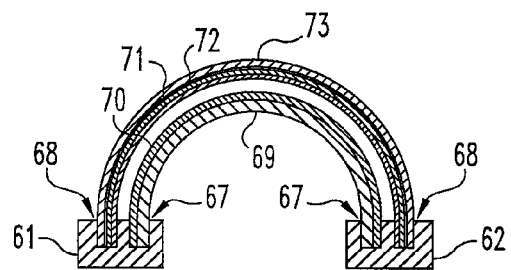
FIG. 12 provides a cross-sectional view taken along line 12-12 of FIG. 9 and viewed in the direction of the arrows.

With reference now to FIG. 12, shown is an enlarged cross-sectional view taken along line 12-12 of FIG. 9 and viewed in the direction of the arrows. Shown are the rails 61 and 62 which each have inner groves 67 and outer groves 68. Received within inner grove 67 are the ends of a support panel 69 extending the length of the cell 60 and having a generally arcuate cross-section. Ends of support panel 69 can be secured into grooves 67 with any suitable welding, bonding or other attachment technique. Immediately adjacent to support panel 69 is an electrode 70, such as an anode, which is received upon support member 69 but not received within grooves 67. Thus, in one mode of construction, electrode 70 in the completed cell 60 can be removed from the cell 60 and replaced, repaired, etc., if desired. Also shown in FIG. 12 is membrane spacer 71 and ion exchange membrane 72, with the membrane spacer 71 protecting against contact of the membrane 72 and the electrode 70. Also included is membrane guard 73 which protects membrane 72 against damage resulting from contact with articles during shipment or use.

Figure 13:
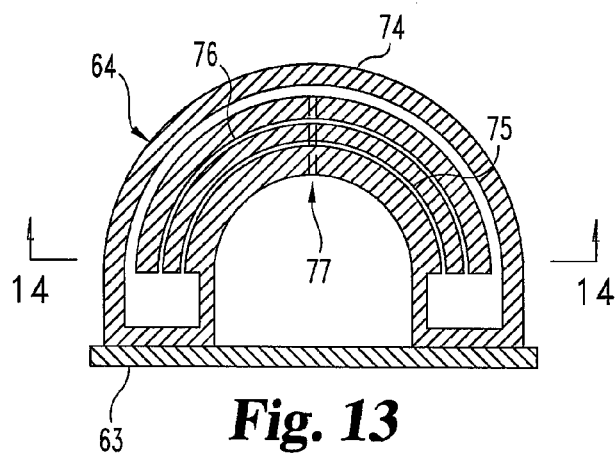
FIG. 13 provides a cross-sectional view taken along line 13-13 of FIG. 9 and viewed in the direction of the arrows.
Figure 14:
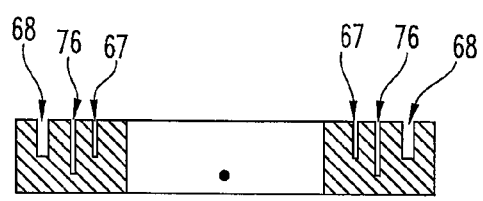
FIG. 14 provides a cross-sectional view taken along line 14-14 of FIG. 13 and viewed in the direction of the arrows.

Referring now to FIG. 13, shown is an enlarged cross-sectional view taken along line 13-13 of FIG. 9 and viewed in the direction of the arrows. Evident is a cross-section of the bottom end cap 64 along with an adjacent cross-brace member 63. Cap 64 is generally arcuate in shape and includes a plurality of arcuate channels therein. A first channel 74 receives a combination of the spacer 71, membrane 72 and guard 73. These layers can be bonded within channel 74 using a suitable epoxy or other bonding agent. Cap 64 also includes generally arcuate channel 75 for receiving support panel 69 which likewise is bonded within channel 75. Cap 64 further includes a channel 76 which is configured to deliver fluid in between the anode 70 and the membrane 72, such as an electrolyte fluid. With reference now to FIG. 14 as well, provided is a side view of the section taken along line 14-14 of FIG. 13 and viewed in the direction of the arrows. Fluid is provided to channel 76 via bore 77. For these purposes, channel 76 extends more deeply into the cap 64 than channels 67 and 68, and bore 77 is located at a level below channels 67 and 68 so as not to intersect them and terminate into the lowermost portion of channel 76. In this manner, electrolyte liquid can be delivered through bore 77 and exit into channel 76, thereafter traveling upwardly in the cell in between anode 70 and membrane 72, traversing its way through the membrane guard 71 which is configured so as to allow its passage. In use, membrane cell 60 is immersed in the paint bath, and a potential difference is applied between the electrode (anode) 70 and the counter-electrode article to be coated. The upper end of cell 60 can be left open and kept at a level above the level of the paint bath. Alternatively, the upper end of the cell 60 could be closed and means provided for the escape of any gases generated during operation. For purposes of electrolyte circulation, cell 60 can also be equipped with an outlet opening 78 such that electrolyte flowing through cell 60 exits from the outlet opening and can be routed conventionally to a treatment or disposal tank or the like.

With reference to FIG. 15, shown is a tubular membrane electrode cell according to the present invention. Except as otherwise noted herein, membrane electrode cell 80 may generally have components as described in U.S. Pat. No. 5,591,316 issued Jan. 7, 1997, which is hereby incorporated by reference in its entirety. Membrane electrode cell 80 generally includes a membrane shell including a neck 81 having attached thereto an electrolyte exit tube 82. Neck 81 is glued into collar 83. It will be understood in this regard that neck 81 and collar 83 may also be provided as a single, integral piece. Cell 80 also includes a cap 84 at the bottom end of the cell 80, and a membrane guard 85 fashioned in such a manner that its inside diameter fits snugly over collar 83 and cap 84, with guard 85 attached to collar and cap by epoxy or other suitable adhesives, or by welding, for example. The membrane shell also includes a membrane 86, e.g. an ion-exchange membrane, encased within cloth layers 87A and 87B, and an inner porous guard tube 88 adjacent thereto. Membrane 86 and its adjacent cloth layers 87A and 87B, and inner porous tube 88 are affixed within grooves defined in collar 83 and cap 84 using epoxy or any other suitable means.

Membrane electrode cell 80 also includes a tubular electrode 89 disposed within the membrane shell. Electrode 89 will serve as an anode, or cathode, depending upon the type of electrodeposition painting to be undertaken, as would be understood by those skilled in the art. Electrode 89 will typically be made of metal or another suitable conductive material. A preferred material is stainless steel. An electrolyte inlet tube 90 extends into the membrane shell and through the interior of the tubular electrode 89, ultimately terminating in an internal electrode cap 91. In use, electrolyte fluid is passed through tube 90 and exits the bottom of cap 91 thereafter flowing upwardly in the membrane shell between the outer surface of electrode 89 and the inner surface of membrane 86 and its accompanying cloth layers. In accordance with one aspect of the invention, a valve 94, especially a one-way valve, is provided in fluid association with the electrolyte supply tube 90, and adapted to allow fluid flow into supply tube 90, and to resist fluid flow out of electrolyte tube 90. Illustratively, this may be provided by the inclusion of a three-way or "T" connector 92 situated within the electrolyte supply tube 90, having affixed within its horizontally-extending leg a section of PVC or other tubing 93. One-way valve 94 is trapped at the shoulder of the connection of tube 93 and "T" connector 92. In this regard, FIGS. 15A and 15B illustrate one suitable one-way valve for use in the invention. Shown is flat valve 94 including a flexible membrane 95 having a slit pattern 96 cut therein. With particular . reference to FIG. 15B, shown is a rear view of the valve depicted in FIG. 15A, revealing backing screen 97 associated with one side of the valve 94. Such valves are conventional in the art and these and other suitable one-way or check valves of a variety of designs, including for example flap valves or ball-cage valves, will be suitable for use in the present invention.

With continued reference to FIGS. 15, 15A and 15B, the cell 80 is highly advantageous in use. In particular, it is sometimes necessary to remove the anode 89 and associated supply tube 90 and internal cap 91, for replacement, repair, or otherwise. Valve 94 facilitates this operation by allowing fluid trapped within the interior of electrode 89 to drain into the membrane shell as electrode 89 is being lifted out of the membrane shell, with valve 94 opening in response to. increased liquid pressure generated at the exterior of the valve. This avoids the need of lifting large amounts of water when removing electrode 89 from the cell 80. This feature is especially advantageous in electrode cells 80 having electrodes 89 having relatively large internal diameters, for example greater than about 4 inches, and typically in the range of about 4 or 5 inches up to about 8 inches ID. It will also be understood that valve 94 could be incorporated in other positions allowing fluid communication between the interior of the electrode 89 and the membrane shell. For example, valve 94 could be positioned in internal cap 91.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A membrane electrode assembly for use in a paint electrodeposition chamber containing a liquid medium, comprising:
   a tubular electrode;
   a tubular enclosure for separating said electrode from the liquid medium, the enclosure including a tubular membrane, said tubular electrode received within said tubular enclosure wherein liquid is trappable within the interior of the tubular electrode;
   an electrolyte supply tube received within the interior of the tubular electrode and arranged to allow an electrolyte fluid passing through the supply tube to flow into a space between an outer surface of the tubular electrode and an inner surface of the tubular enclosure; and
   a valve in fluid communication with the interior of the tubular electrode and adapted to selectively permit flow of the liquid from the interior of the tubular electrode into the tubular enclosure.

2. The membrane electrode assembly of claim 1, wherein said valve is a one-way valve.

3. The membrane electrode assembly of claim 2, wherein said one-way valve is a flap-valve.

4. The membrane electrode assembly of claim 1, wherein said valve is fluidly coupled to the electrolyte supply tube.

5. The membrane electrode assembly of claim 1, wherein said tubular membrane is an ion-exchange membrane.

6. The membrane electrode assembly of claim 5, wherein said enclosure also includes:
   a tubular membrane guard mounted external of said ion-exchange membrane;
   at least one cloth layer attached to said ion-exchange membrane; and
   at least one porous tube mounted between said tubular membrane and said tubular electrode.

7. The membrane electrode assembly of claim 6, also comprising an internal electrode cap within the tubular electrode to which the electrolyte supply tube is connected, and wherein the valve is mounted in the internal electrode cap.

8. The membrane electrode assembly of claim 7, wherein said supply tube is formed from a rigid plastic.

9. The membrane electrode assembly of claim 1, also comprising an internal electrode cap within the tubular electrode.

10. The membrane electrode assembly of claim 9, wherein the valve is mounted in the supply tube or the internal electrode cap.

11. The membrane electrode assembly of claim 9, wherein the tubular electrode, supply tube and internal electrode cap form a removable assembly that is removable from the tubular enclosure, and wherein the valve is operable to open in response to removal of the removable assembly from the tubular enclosure when liquid is trapped within the interior of the tubular electrode.

12. A system for electrodeposition of paint on a counter-electrode, comprising:
   an electrodeposition chamber containing an electroconductive liquid medium including paint;
   at least one membrane electrode assembly according to claim 1.

\* \* \* \* \*